Oct. 28, 1924.
I. G. A. DU REES
1,512,914
CROSS CHAIN CONNECTER FOR ANTISKID CHAINS
Filed March 7, 1924
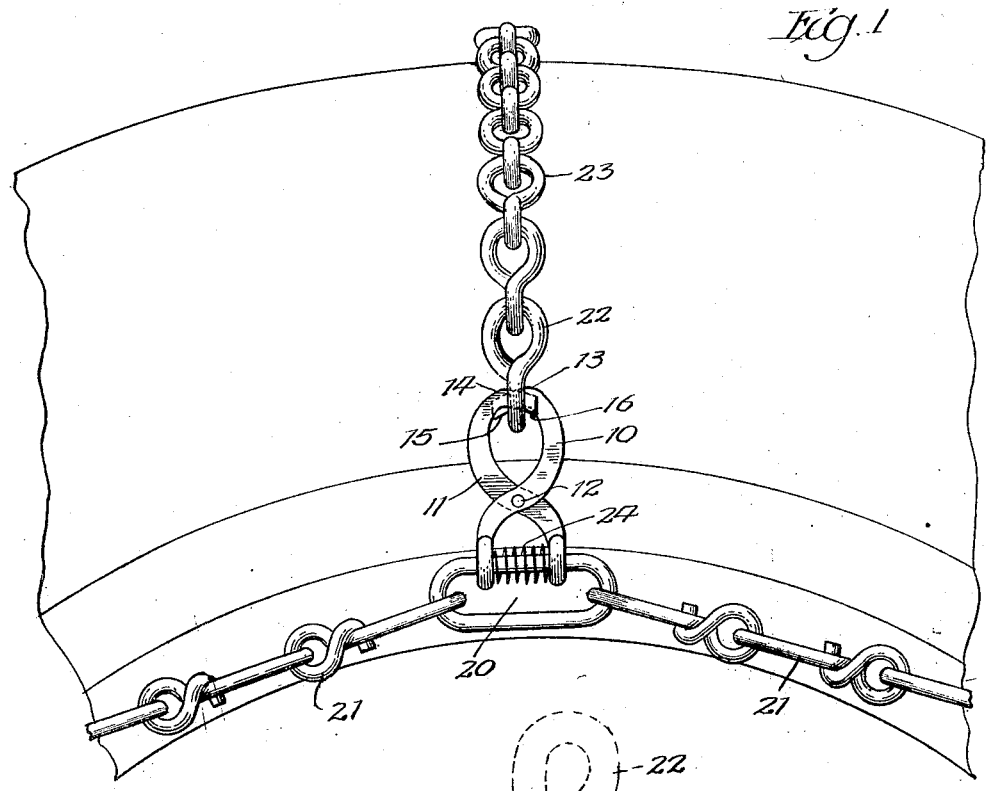
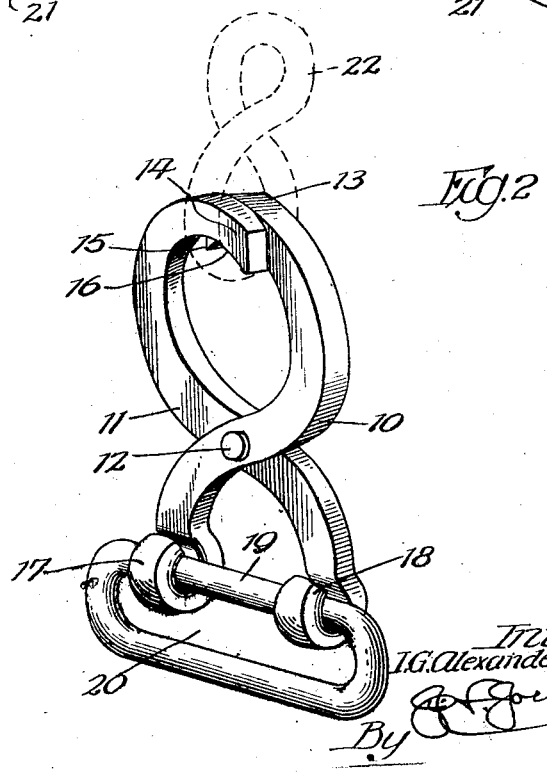
Inventor
I.G. Alexander Du Rees
By
Atty.

Patented Oct. 28, 1924.

1,512,914

UNITED STATES PATENT OFFICE.

IVOR G. ALEXANDER du REES, OF WINNETKA, ILLINOIS.

CROSS-CHAIN CONNECTER FOR ANTISKID CHAINS.

Application filed March 7, 1924. Serial No. 697,532.

*To all whom it may concern:*

Be it known that I, IVOR GOTTFRIED ALEXANDER DU REES, a citizen of the United States, residing at Winnetka, in the county of Cook and State of Illinois, have invented certain new and useful Improvements in Cross-Chain Connecters for Antiskid Chains, of which the following is a specification.

This invention relates to improvements in connecters particularly adapted, though not necessarily limited in its use for connecting the cross chains of an anti-skid chain with the side links of such devices, and one of the objects of the invention is to provide an improved, simple and efficient device of this character by means of the use of which the cross chains may be readily secured in position and as readily removed or disconnected from the side chain links when desired.

A further object is to provide an improved device of this character which may be permanently connected with the side chain links and to which device the cross chains may be attached and disconnected therefrom, thereby insuring that when new cross chains are applied, they will be uniformly spaced throughout the length of the side members of the anti-skid chain.

A further object is to provide an improved device of this character which may be readily manipulated without the use of tools, and so constructed that the stress of the side chains or members as well as the stress of the cross chains will assist in maintaining the parts in locked relation.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which—

Figure 1 is a view in elevation showing a device of this character constructed in accordance with the principles of this invention as employed in connecting a cross chain to one of the side members of an anti-skid chain.

Figure 2 is an enlarged detail perspective view of the connecting device.

Referring more particularly to the drawing the connecting device consists essentially of two members 10 and 11 pivotally connected intermediate their ends as at 12 so as to cross each other. The extremity 13 of the member 10 and the extremity 14 of the member 11 are shaped to form opposing hook shaped portions which are adapted to overlap each other. The faces 15 of the hook shaped extremity 13, and 16 of the hook shaped extremity 14 are inclined for a purpose to be hereinafter set forth. Formed at the other extremity of the member 10 is an eye 17 and formed at the other extremity of the member 11 is an eye 18. These eyes are adapted to engage the wall 19 of an elongated link 20. The link 20, any number of which may be provided, constitutes a portion of the side member 21 of an anti-skid chain. By the provision of the eyes 17–18 on the ends of the members 10 and 11 it will be manifest that the members may be rocked about their pivot 12 so as to separate the hooked extremities or cause them to be moved towards each other. When the eyes 17 and 18 are moved towards each other the hooked extremities will be opened but when the eyes are separated the hooked extremities will be closed.

In use, the opposed hook shaped extremities 13 and 14 are adapted to engage in a link 22 of the cross chain 23, and from opposite sides of the link and when in position the stress of the side members 21 and link 20 together with the cross chains 23 upon the connecting device will operate, by reason of the inclined surfaces 15 and 16 to draw the hooked shaped portions towards each other and firmly lock or secure the cross chain in position.

In the event that it is desired to remove the cross chain all that is necessary is to move the eyes 17–18 towards each other and the hook shaped portions will be separated.

If desired and as a means for assisting in holding the members 10 and 11 in locked relation with respect to each other, an elastic element 24 such as a coil spring or the like may be provided and encompasses the side member 19 of the link 20. This elastic member 24 may preferably be in the form of a coil spring and is disposed between the extremities of the members 10 and 11, which carry the eyes 17 and 18. When it is desired to detach the cross chain 23 the members 10 and 11 are rocked about their pivots against the stress of the elastic element 24.

Obviously any number of these connecting devices may be employed, and when employed in the manner as shown in the drawing they will constitute a permanent portion of the side members so as to insure that the cross chains will be properly spaced throughout the lengths of the side members when the cross chains are in position.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A device of the character described including co-operating members pivotally connected intermediate their ends, one extremity of the members being shaped to form opposed hook shaped portions adapted to engage in a link of a cross chain and from opposite sides of the link, an elongated link, means loosely connecting the other ends of said members with the said elongated side link for free movement towards and away from each other to open and close the said hook shaped extremities, and means independent of and remote from the pivot of the members and tending normally to separate the ends of the said members which are connected with the said elongated side link to close the said hook shaped ends with respect to each other.

2. A device of the character described including co-operating members connected intermediate their ends for relative movement towards and away from each other, one extremity of the members being shaped to form opposed hook shaped portions adapted to engage in a link of a cross chain and from opposite sides of the link, an elongated link, means loosely connecting the other ends of said members with the said elongated side link for free movement towards and away from each other to open and close the said hook shaped extremities, and a resilient element carried by one wall of the elongated side link and disposed between the ends of the said member that are connected with the last said link and tending normally to separate them.

3. A device of the character described including co-operating members connected intermediate their ends for relative movement towards and away from each other, one extremity of the members being shaped to form opposed hook shaped portions adapted to engage in a link of a cross chain and from opposite sides of the link, the faces of the hook shaped portions which engage the said link being inclined whereby the stress of the link upon said faces will tend to draw the hook shaped portions towards each other, an elongated side link, means loosely connecting the other ends of the said members with one wall of the said elongated link for movement towards and away from each other, and a resilient element encompassing the wall of said link intermediate the ends of the said members that are connected with the side link and tending normally to separate such ends of the members.

4. A device of the character described including cross members pivotally connected intermediate their ends, one end of said members being shaped to form opposed hooks adapted to engage in a link of a cross chain and from opposite sides of the link, an elongated side link, eyes formed at the other ends of said members and through which eyes one wall of the said side link loosely passes, the said eyes being freely movable towards and away from each other to open and close the said hook shaped ends, and a resilient element, the ends of said element directly engaging and tending normally to separate the eye shaped ends of the said members and move the said hook shaped ends towards each other.

5. A device of the character described including cross members pivotally connected intermediate their ends, one end of said members being shaped to form opposed hooks adapted to engage in a link of a cross chain and from opposite sides of the link, an elongated side link, eyes formed at the other ends of said members and through which eyes one wall of the said side link loosely passes, the said eyes being freely movable towards and away from each other to open and close the said hook shaped ends, and a resilient element encompassing the wall of the said side link intermediate said eyes and tending normally to separate the latter.

In testimony whereof I have signed my name to this specification, on this 4th day of March, A. D. 1924.

I. G. ALEXANDER DU REES.